US011687466B1

(12) United States Patent
Favor et al.

(10) Patent No.: US 11,687,466 B1
(45) Date of Patent: Jun. 27, 2023

(54) TRANSLATION LOOKASIDE BUFFER CONSISTENCY DIRECTORY FOR USE WITH VIRTUALLY-INDEXED VIRTUALLY-TAGGED FIRST LEVEL DATA CACHE THAT HOLDS PAGE TABLE PERMISSIONS

(71) Applicant: Ventana Micro Systems Inc., Cupertino, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 0 days.

(21) Appl. No.: 17/751,972

(22) Filed: May 24, 2022

Related U.S. Application Data

(60) Provisional application No. 63/341,166, filed on May 12, 2022.

(51) Int. Cl.
*G06F 12/1045* (2016.01)
*G06F 12/0864* (2016.01)

(52) U.S. Cl.
CPC ...... *G06F 12/1063* (2013.01); *G06F 12/0864* (2013.01); *G06F 12/1054* (2013.01)

(58) Field of Classification Search
None
See application file for complete search history.

(56) References Cited

U.S. PATENT DOCUMENTS

2007/0250666 A1* 10/2007 Sartorius ............. G06F 12/0891 711/3
2017/0286315 A1 10/2017 Mukherjee et al.
2017/0371799 A1* 12/2017 Mukherjee .......... G06F 12/1027
2018/0089094 A1* 3/2018 Clancy ................ G06F 12/1063

* cited by examiner

*Primary Examiner* — Yaima Rigol
(74) *Attorney, Agent, or Firm* — E. Alan Davis; Huffman Law Group, PC (57) ABSTRACT

A virtually-indexed and virtually-tagged cache has E entries each holding a memory line at a physical memory line address (PMLA), a tag of a virtual memory line address (VMLA), and permissions of a memory page that encompasses the PMLA. A directory having E corresponding entries is physically arranged as R rows by C columns=E. Each directory entry holds a directory tag comprising hashes of corresponding portions of a page address portion of the VMLA whose tag is held in the corresponding cache entry. In response to a translation lookaside buffer management instruction (TLBMI), the microprocessor generates a target tag comprising hashes of corresponding portions of a TLBMI-specified page address. For each directory row, the microprocessor: for each directory entry of the row, compares the target and directory tags to generate a match indictor used to invalidate the corresponding cache entry.

29 Claims, 7 Drawing Sheets

TRANSLATION LOOKASIDE BUFFER CONSISTENCY DIRECTORY FOR USE WITH VIRTUALLY-INDEXED VIRTUALLY-TAGGED FIRST LEVEL DATA CACHE THAT HOLDS PAGE TABLE PERMISSIONS

CROSS REFERENCE TO RELATED APPLICATION(S)

This application claims priority to U.S. Provisional Application Ser. No. 63/341,166 filed May 12, 2022.

BACKGROUND

High-performance processors typically support virtual memory capability. A virtual memory system maps, or translates, virtual addresses used by a program to physical addresses used by hardware to address memory. Virtual memory has the advantages of hiding the fragmentation of physical memory from the program, facilitating program relocation, and of allowing the program to see a larger memory address space than the actual physical memory available to it. These advantages are particularly beneficial in high-performance systems that support time-sharing of the processor by multiple programs or processes.

The operating system creates and maintains in memory page tables that specify the mapping of virtual addresses to physical addresses. The page tables may also include other information such as page permissions (e.g., whether the page is readable, writeable, and/or executable, whether the page is owned by a specific processor or is global to all processes). The page tables may be in the form of a hierarchy of tables, some of which map virtual addresses to intermediate table addresses. When a program accesses memory using a virtual address, the page tables must be accessed to accomplish the translation of the virtual address to its physical address, commonly referred to as a page table walk, or table walk. In virtual memory systems that support multiple page sizes, the page size may be determined from the number of levels in the hierarchy that must be traversed to reach a leaf entry that provides the address translation. The additional memory accesses the processor must perform during the table walk can significantly delay the ultimate access to the memory to obtain the data or instruction desired by the program at the physical address produced by the table walk.

To address this problem and improve performance, high-performance processors include translation-lookaside buffers (TLB), also referred to as an address-translation cache. A TLB is a hardware structure of a processor that caches the virtual to physical address translations to greatly reduce the likelihood that the page tables will need to be accessed, i.e., to reduce the likelihood of a need for a table walk. The virtual address to be translated is looked up in the TLB. If the virtual address hits in the TLB, the TLB provides the physical address translation in much less time than would be required to access the page tables in memory to perform the table walk. High-performance processors may include more than one TLB, e.g., in a hierarchy similar to a cache memory hierarchy and/or for different page sizes.

Assume an entry of a TLB is caching a physical address translation for a virtual address and the operating system updates a page table entry that causes the translation for the virtual address to change. In such an event, the TLB entry needs to be invalidated so that it does not provide a stale translation of the virtual address. Most instruction set architectures do not require the processor to include hardware to maintain the consistency, or coherency, of its TLBs with the page tables. Rather, most instruction set architectures require the operating system to maintain the consistency of the processor's TLBs. Such instruction set architectures provide a TLB maintenance instruction (TLBMI) that enables the operating system to invalidate TLB entries. For example, one type of the TLBMI may specify a virtual address, and the processor invalidates any TLB entry that translates the virtual address. Another type of the TLBMI may specify an address space identifier (ASID) or process identifier (PCID), and the processor invalidates any TLB entry associated with the specified ASID/PCID. Another type of the TLBMI may instruct the processor to invalidate all entries of the TLB, regardless of virtual address or ASID/PCID. In the case of a processor that supports virtualization, each TLB entry may also include in its tag a virtual machine identifier (VMID), and if the processor is inside a virtual machine, the TLBMI type may instruct the processor to invalidate only TLB entries having a matching VMID.

SUMMARY

In one embodiment, the present disclosure provides a microprocessor that includes a virtually-indexed and virtually-tagged cache having E entries. Each cache entry is configured to hold a copy of a line of memory at a physical memory line address and a tag of a virtual memory line address. The virtual memory line address is translatable into the physical memory line address. Each cache entry is also configured to hold permissions associated with a page of memory that encompasses the physical memory line address. The microprocessor also includes a directory having E entries corresponding to the E cache entries. The directory is physically arranged as R rows and C columns, and R*C=E. Each directory entry is configured to hold a directory tag comprising one or more hashes of corresponding one or more portions of a page address. The page address is a portion of the virtual memory line address whose tag is held in the cache entry corresponding to the directory entry. In response to a translation lookaside buffer management instruction (TLBMI) that specifies a virtual address, the microprocessor is configured to generate a target tag comprising one or more hashes of corresponding one or more portions of a page address. The page address is a portion of the virtual address specified by the TLBMI. In response to the TLBMI, the microprocessor is also configured to, for each row of the R rows of the directory: for each directory entry of the C directory entries of the row, make a comparison of the target tag with the directory tag of the directory entry and generate a match indictor based on the comparison; and for each directory entry having a true match indictor, invalidate the corresponding cache entry.

In another embodiment, the present disclosure provides a method for use in a microprocessor that includes a virtually-indexed and virtually-tagged cache having E entries. Each cache entry is configured to hold a copy of a line of memory at a physical memory line address and a tag of a virtual memory line address. The virtual memory line address is translatable into the physical memory line address. Each cache entry is also configured to hold permissions associated with a page of memory that encompasses the physical memory line address. The microprocessor also includes a directory having E entries corresponding to the E cache entries. The directory is physically arranged as R rows and C columns, and R*C=E. Each directory entry is configured to hold a directory tag comprising one or more hashes of corresponding one or more portions of a page address. The page address is a portion of the virtual memory line address whose tag is held in the cache entry corresponding to the directory entry. The method includes, in response to a translation lookaside buffer management instruction (TLBMI) that specifies a virtual address, generating a target tag comprising one or more hashes of corresponding one or more portions of a page address. The page address is a portion of the virtual address specified by the TLBMI. The method also includes, in response to the TLBMI, for each row of the R rows of the directory: for each directory entry of the C directory entries of the row, making a comparison of the target tag with the directory tag of the directory entry and generating a match indictor based on the comparison. The method also includes, in response to the TLBMI, for each row of the R rows of the directory, for each directory entry having a true match indictor, invalidating the corresponding cache entry.

In yet another embodiment, the present disclosure provides a non-transitory computer-readable medium having instructions stored thereon that are capable of causing or configuring a microprocessor that includes a virtually-indexed and virtually-tagged cache having E entries. Each cache entry is configured to hold a copy of a line of memory at a physical memory line address and a tag of a virtual memory line address. The virtual memory line address is translatable into the physical memory line address. Each cache entry is also configured to hold permissions associated with a page of memory that encompasses the physical memory line address. The microprocessor also includes a directory having E entries corresponding to the E cache entries. The directory is physically arranged as R rows and C columns, and R*C=E. Each directory entry is configured to hold a directory tag comprising one or more hashes of corresponding one or more portions of a page address. The page address is a portion of the virtual memory line address whose tag is held in the cache entry corresponding to the directory entry. In response to a translation lookaside buffer management instruction (TLBMI) that specifies a virtual address, the microprocessor is configured to generate a target tag comprising one or more hashes of corresponding one or more portions of a page address. The page address is a portion of the virtual address specified by the TLBMI. In response to the TLBMI, the microprocessor is also configured to, for each row of the R rows of the directory: for each directory entry of the C directory entries of the row, make a comparison of the target tag with the directory tag of the directory entry and generate a match indictor based on the comparison; and for each directory entry having a true match indictor, invalidate the corresponding cache entry.

DETAILED DESCRIPTION

Embodiments are described of a processor that includes a virtually-indexed virtually-tagged level-1 (L1) data cache (VIVTL1DC) and is therefore absent a L1 TLB. That is, because the VIVTL1DC is indexed and tagged with a virtual address, there is no need for a physical address to access the VIVTL1DC and therefore no need for a L1 TLB to provide a physical address translation of the virtual address. Instead, the processor includes a level-2(L2) physically-indexed physically-tagged cache and a L2 TLB that provides physical address translations used to access the L2 cache.

However, during execution of a load/store instruction that specifies a virtual address, the processor needs permissions associated with the page of memory implicated by the virtual address in order to know whether the load/store instruction has permissions to access the page of memory implicated by the virtual address. So, each entry of the VIVTL1DC also caches the permissions associated with the page of memory implicated by the line of memory implicated by the virtual address. Therefore, the VIVTL1DC effectively functions as a L1 TLB in the context of page table consistency. That is, in response to a TLBMI, not only do relevant entries of the L2 TLB need to be invalidated, but relevant entries of the VIVTL1DC also need to be invalidated so that the VIVTL1DC does not provide stale permissions after a relevant page table has been updated by the operating system.

As described above, a TLBMI operates at the granularity of a page. The number of bits that are part of the set index of the VIVTL1DC may be determined for a given page size and cache line size. For example, assume 64 B cache lines and a 4 KB page. In such case, there are six bits of the page offset that are part of the set index, and a 4 KB page may be spread across 64 different sets of the cache. However, for another example, a 2 MB page may spread across 2^15 different sets, which is effectively all the sets of the cache. Since a TLBMI does not specify a particular page size, the processing of the TLBMI must assume the largest possible page size and search all entries of the VIVTL1DC. However, the number of entries in the VIVTL1DC may be relatively large and may be arranged as a large number of sets. For example, in one embodiment the VIVTL1DC is a 4-way set-associative cache that includes 1024 entries arranged in 256 sets. Even assuming all the ways of a given set may be searched for a relevant entry that needs to be invalidated in response to a TLBMI, it may take 256 clock cycles to search all the sets of the VIVTL1DC, which may be performance prohibitive.

Embodiments are described in which the processor includes a TLB consistency directory (TCD) having entries that correspond to the VIVTL1DC entries, and each TCD entry holds hashed information that may be used to determine whether a corresponding VIVTL1DC entry needs to be invalidated. Advantageously, the TCD is physically arranged in a wider and shallower manner than the VIVTL1DC, i.e., has significantly fewer rows (e.g., approximately an order of magnitude) than the VIVTL1DC (and correspondingly has significantly more columns than the VIVTL1DC), such that all the entries of the TCD may be searched in significantly fewer clock cycles than the VIVTL1DC, as described in more detail below.

Figure 1:
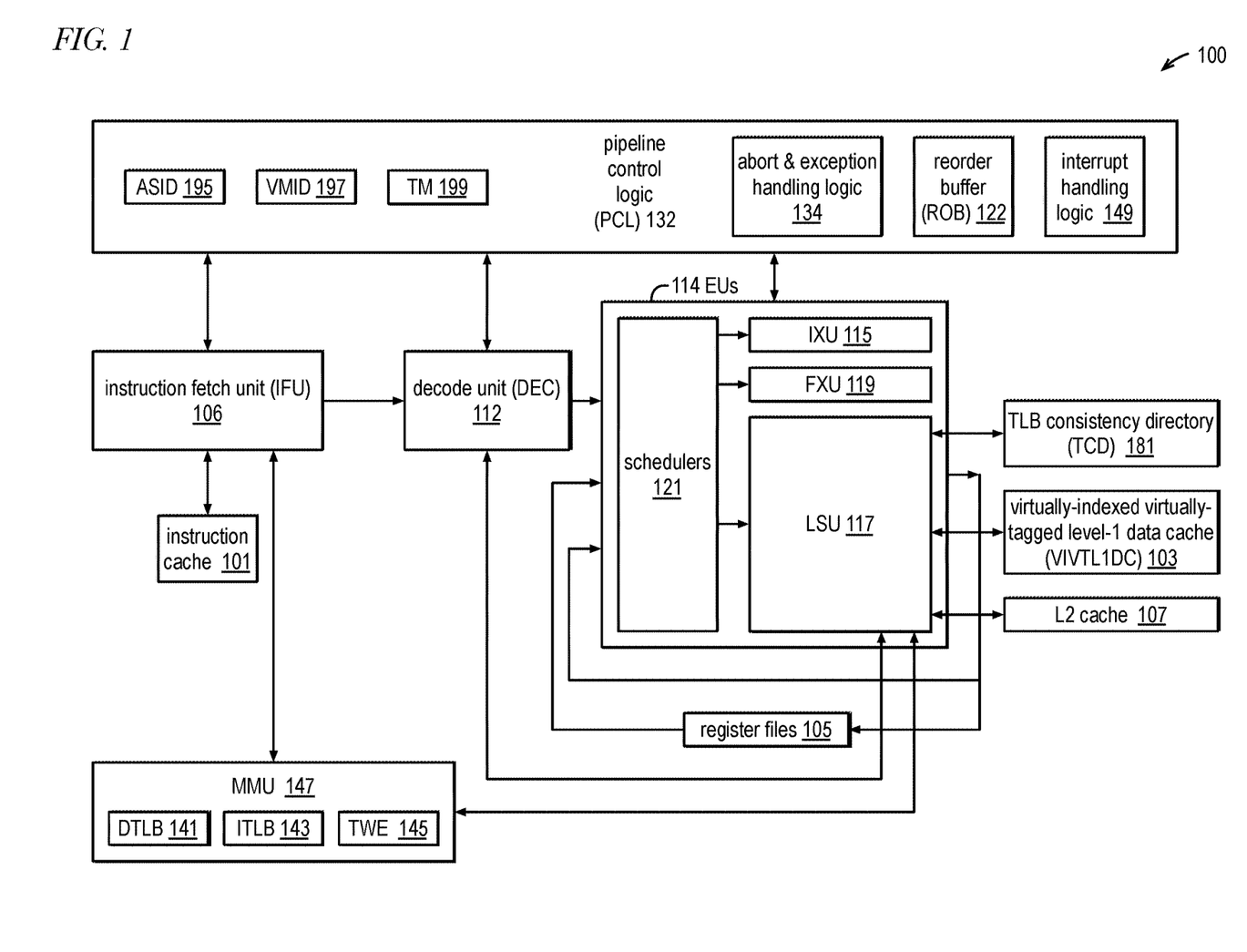
FIG. 1 is an example block diagram of a pipelined super-scalar, out-of-order execution microprocessor core that performs speculative execution of instructions in accordance with embodiments of the present disclosure.

FIG. 1 is an example block diagram of a pipelined super-scalar, out-of-order execution microprocessor core 100 that includes a TLB consistency directory (TCD) 181 for aid in maintaining page table consistency in a performant manner within a virtually-indexed virtually-tagged L1 data cache (VIVTL1DC) 103 that effectively operates as a L1 TLB in accordance with embodiments of the present disclosure. Although a single core 100 is shown, the TLB consistency methods described herein are not limited to a particular number of cores. Generally, the TLB consistency methods may be employed in a processor conforming to various instruction set architectures (ISA), including but not limited to, x86, ARM, PowerPC, SPARC, MIPS, and RISC-V ISA.

The core 100 comprises a pipeline that includes an instruction cache 101, an instruction fetch unit (IFU) 106, a decode unit (DEC) 112, and a plurality of execution units (EU) 114. The core 100 also includes the TCD 181, the VIVTL1DC 103, a L2 cache 107, and register files 105. In one embodiment, the register files 105 include an integer register file, a floating-point register file and a vector register file. In one embodiment, the register files 105 include both architectural registers as well as micro-architectural registers. In one embodiment, the EUs 114 include integer execution units (IXU) 115, floating point units (FXU) 119, and a load-store unit (LSU) 117.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. As described above, the DTLB 141 operates as a L2 TLB that provides virtual-to-physical address translations used to access the physically-indexed physically-tagged L2 cache 107. In one embodiment, the DTLB 141 comprises multiple TLBs for different page sizes, e.g., a 4 KB page size TLB, a 2 MB page size TLB, and a 1 GB and 512 GB page size TLB. Similarly, the ITLB 143 provides virtual-to-physical address translations used to access the instruction cache 101. The microprocessor 100 may also include other blocks not shown, such as a write combining buffer, a load buffer, a bus interface unit, and various levels of cache memory above the instruction cache 101 and VIVTL1DC 103 and L2 cache 107, some of which may be shared by other cores of the processor. Furthermore, the core 100 may be multi-threaded in the sense that it includes the ability to hold architectural state (e.g., program counter, architectural registers) for multiple threads that share the execution units 114 to perform simultaneous multithreading (SMT).

Pipeline control logic (PCL) 132 is coupled to and controls various aspects of the pipeline. The PCL 132 includes a ReOrder Buffer (ROB) 122, interrupt handling logic 149, and abort and exception-handling logic 134. The PCL 132 also holds a current address space identifier (ASID) 195, a current virtual machine identifier (VIVID) 197, and a current translation mode (TM) 199 of the core 100, each of which is described in more detail below. In one embodiment, the TM 199, VMID 197, and/or ASID 195 may be reflected in one or more control and status registers.

The IFU 106 fetches instructions from the instruction cache 101 and provides the fetched instructions to the DEC 112. The IFU 106 maintains the program counter (PC) and may include predictors that predict program flow that may be altered by control flow instructions, such as branch instructions.

The DEC 112 decodes architectural instructions into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that can execute up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The IFU 106, DEC 112, and EUs 114 form a pipeline in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op. Instructions are allocated into the ROB 122 in program order.

In one embodiment, each of the EUs 114 includes a dedicated scheduler 121. In an alternate embodiment, a scheduler 121 common to all of the EUs 114 (and integrated with the ROB 122 according to one embodiment) serves all of the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available. The IFU 106, DEC 112, each of the execution units 114, and PCL 132, as well as other structures of the core 100, may each have their own pipeline stages in which different operations are performed.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

The core 100 provides virtual memory support. Each process, or thread, running on the core 100 may have its own address space identified by an ASID. The core 100 may use the ASID to perform address translation. For example, the ASID may be associated with the page tables, or translation tables, of a process. To distinguish entries for different processes, each entry of the TLBs (e.g., DTLB 141 and ITLB 143) may include in its tag the ASID associated with the operation that caused the fill of the entry into the TLB. In the x86 ISA, for example, an ASID may correspond to a processor context identifier (PCID). As described above, because the VIVTL1DC 103 holds page permissions within each entry, it effectively operates as a TLB and therefore one or more of its entries may need to be invalidated in response to a TLBMI to keep it consistent with the page tables. To accomplish this, the TCD 181 includes in the tag of each entry a hashed ASID, as described in more detail below.

The core 100 also may provide machine virtualization support. Each virtual machine running on the core 100 may have its own VMID. To distinguish entries for different virtual machines, each entry of the TLBs 141 and 143 may include in its tag the VMID associated with the operation that caused the fill of the entry into the TLB. To accomplish TLB consistency within the VIVTL1DC 103, the TCD 181 also includes in the tag of each entry a hashed VMID, as described in more detail below.

The TM 199 indicates whether or not the core 100 is currently running inside a virtual machine (i.e., the virtual machine identified by the VMID 197). To distinguish entries for different translation modes, each entry of the TLBs (e.g., DTLB 141 and ITLB 143) may include in its tag the TM associated with the operation that caused the fill of the entry into the TLB. To accomplish TLB consistency within the VIVTL1DC 103, the TCD 181 also includes in the tag of each entry a TM, as described in more detail below. In one embodiment, the TM 199 may be included in a state of the core 100 that also includes a permission level (e.g., user, supervisor, and/or hypervisor).

Figure 2:
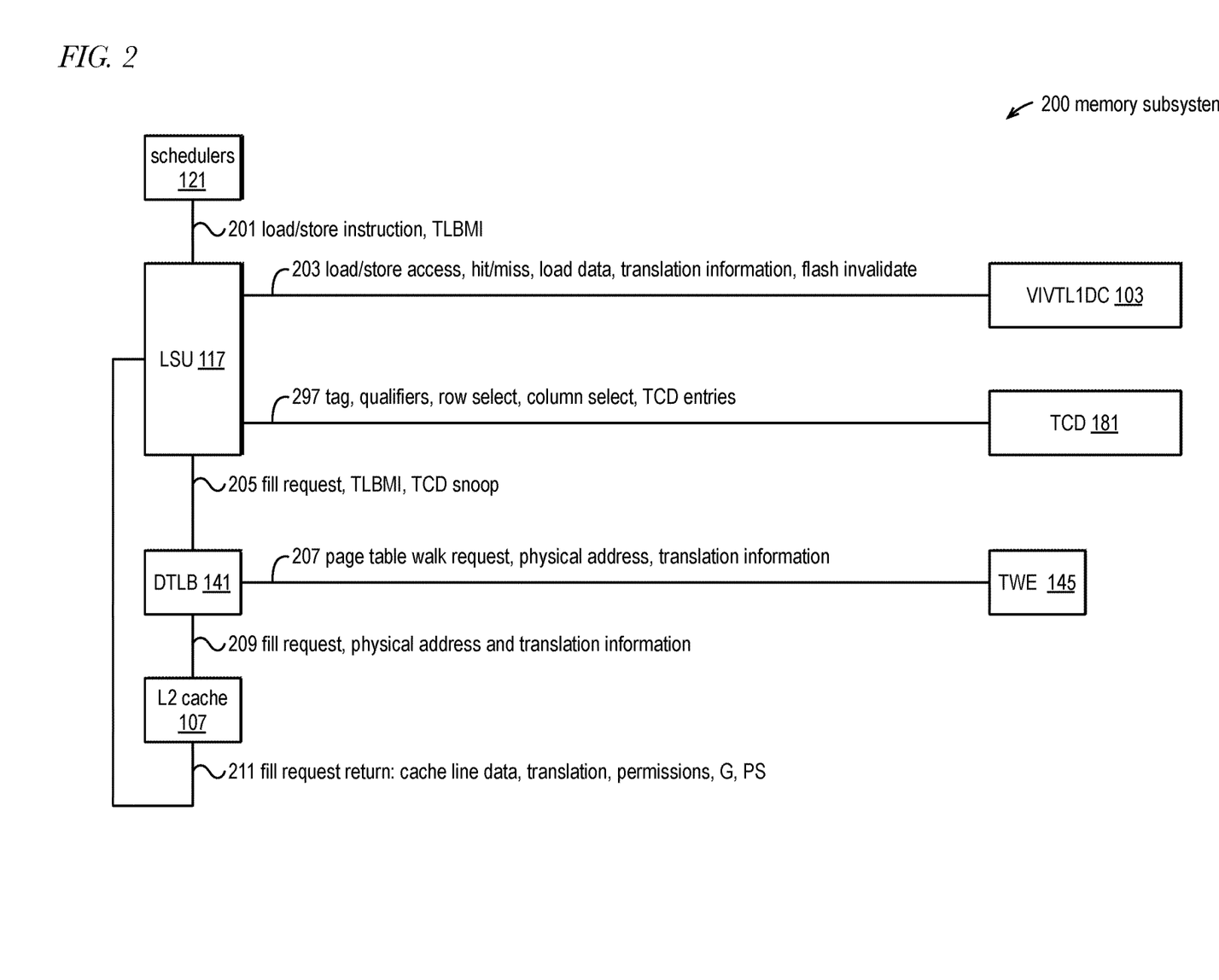
FIG. 2 is an example block diagram of a memory subsystem that includes blocks of FIG. 1 in accordance with embodiments of the present disclosure.

FIG. 2 is an example block diagram of a memory subsystem 200 that includes blocks of FIG. 1 in accordance with embodiments of the present disclosure. The memory subsystem 200 includes the schedulers 121, LSU 117, DTLB 141, L2 cache 107, VIVTL1DC 103, TCD 181, and TWE 145 of FIG. 1. FIG. 2 illustrates the general flow of processing by the memory subsystem 200 of a TLBMI and a load/store instruction, including a fill of the VIVTL1DC 103 and TCD 181 in response to a miss in the VIVTL1DC 103. Processing of a load/store instruction will be described first.

The scheduler 121 issues a load/store instruction 201 to the LSU 117 when all source operands upon which the instruction depends are available for execution and a pipeline of the LSU 117 is available to execute the instruction 201. The scheduler 121 retains a load/store instruction 201 until it completes execution so that the load/store instruction 201 may be replayed or retried, if necessary, e.g., in the case of a miss in the VIVTL1DC 103. In one embodiment, completion of execution of a load/store instruction 201 means the instruction 201 has been executed by the LSU 117 to the point that there is no longer a possibility of being canceled, retried, replayed, or aborted. Completion of execution of an instruction 201 may be signaled by reporting the execution completion to the ROB 122. A load/store instruction 201 is canceled if its execution is stopped, e.g., while in the LSU 117 pipeline after being issued thereto. A load/store instruction 201 is retried when its execution is canceled and made eligible for reissue by the scheduler 121. A load/store instruction 201 is replayed when its execution is canceled and given a status such that it is eligible for reissue by the scheduler 121 at a later point in time, e.g., once all memory operands upon which it is dependent are available, including a return 211 of a cache line fill request, as described in more detail below. An instruction 201 is aborted when it is flushed from the pipeline.

The LSU 117 executes the load/store instructions 201. In one embodiment, the VIVTL1DC 103 may be considered as an element included within the LSU 117. The LSU 117 accesses the VIVTL1DC 103 with the load/store address 203 (e.g., virtual load/store address 423 of FIG. 4) specified by the load/store instruction 201. The VIVTL1DC 103 responds with a hit or miss indication 203. In the case of a hit, the VIVTL1DC 103 provides translation information 203 associated with the load/store address. (In the case of a load instruction, the VIVTL1DC 103 also provides the copy of the line of memory 203 implicated by the load/store address.) The translation information 203 may include permissions and attributes associated with a memory page implicated by the load/store address 203 such as the page size, the global (G) bit, read/write/execute/user permissions, a memory type, and/or whether the page is currently present in memory. Because some of the translation information 203 is obtained from the page tables, if the operating system executes a TLBMI because it modified the page tables, the translation information 203 may be stale; thus, any entry in the VIVTL1DC 103 implicated by the TLBMI needs to be invalidated. As described herein, the TCD 181 is used to determine in a performant manner which of the VIVTL1DC 103 entries need to be invalidated. In the case of a hit for a load instruction, the VIVTL1DC 103 also outputs on the LSU 117 result bus the data specified by the load instruction 201. The VIVTL1DC 103 is described in more detail below with respect to FIGS. 3 and 4.

If the load/store address 203 misses in the VIVTL1DC 103, the LSU 117 generates a cache line fill request 205 (e.g., fill request 433 of FIG. 4) to the DTLB 141 to obtain the cache line implicated by the load/store address 203 and the load/store instruction 201 is replayed. The fill request 205 includes the load/store address. The DTLB 141 looks up the load/store address to determine whether it has a translation for the load/store address. If not, i.e., if the load/store address misses in the DTLB 141, the DTLB 141 generates a page table walk request 207 to the TWE 145 of FIG. 1. The TWE 145 performs a page table walk and returns the physical address translation 207 of the load/store address and memory page translation information 207 (e.g., page present, read/write/execute/user permissions, memory type, page size (PS), global bit (G)) associated with the memory page implicated by the load/store address.

After receiving the response 207 from the TWE 145, to obtain the cache line data implicated by the load/store address, the DTLB 141 forwards the fill request 209 on to the L2 cache 107. The fill request 209 is augmented with the translation information obtained from the page table walk and the physical address translation.

The L2 cache 107 includes a return path for providing the fill request return 211 to the LSU 117. The L2 cache 107 is accessed using the physical address translation 207 received from the DTLB 141. The L2 cache 107 returns the cache line data 211 obtained from the L2 cache 107 along with the translation information 211. If the physical address misses in the L2 cache 107, the L2 cache 107 obtains the cache line data from a further higher level of the cache hierarchy or from the system memory. In response to receiving the fill request return 211, the LSU 117 fills an entry in the VIVTL1DC 103 with the returned cache line and translation information 211 and fills the corresponding entry 391 in the TCD 181, as described in more detail below with respect to FIGS. 3A, 3C and 6.

Processing of a TLBMI will now be described. As described above, the DEC 112 dispatches instructions in program order. In one embodiment, when the DEC 112 encounters a TLBMI, it waits to dispatch the TLBMI until all instructions older than the TLBMI have retired. The DEC 112 then dispatches the TLBMI 201 to the LSU 117 for execution. In one embodiment, the TLBMI 201 is processed as a special type of store instruction 205 that is issued to the LSU 117 and eventually sent to the DTLB 141 for processing. Upon receiving the TLBMI 205, the DTLB 141 invalidates its relevant entries and sends a copy of the TLBMI 205 to the ITLB 143 which also invalidates its relevant entries. In parallel, the DTLB 141 generates a TCD snoop 205 and sends it to the LSU 117. In response to the TCD snoop 205, the LSU 117 generates each possible value of a row select 297 (e.g., row select 512 of FIG. 5) to cycle through all the rows of entries of the TCD 181. For each received row of TCD entries 297 (e.g., TCD entries 591 of FIG. 5), the LSU 117 compares a target tag (e.g., target tag 597 of FIG. 5) specified in the TCD snoop 205 with a directory tag (e.g., directory tag 322 of FIG. 3C) of each of the TCD entries 297 to determine which corresponding entries in the VIVTL1DC 103 need to be invalidated. The LSU 117 invalidates the indicated entries in the VIVTL1DC 103, e.g., via a flash invalidate vector 203 (e.g., flash invalidate vector 594 of FIG. 5), as described in more detail below. Once the LSU 117 has completed the TCD snoop 205, the LSU 117 signals completion to the DEC 112 so the DEC 112 can resume dispatching instructions.

Figure 3A:
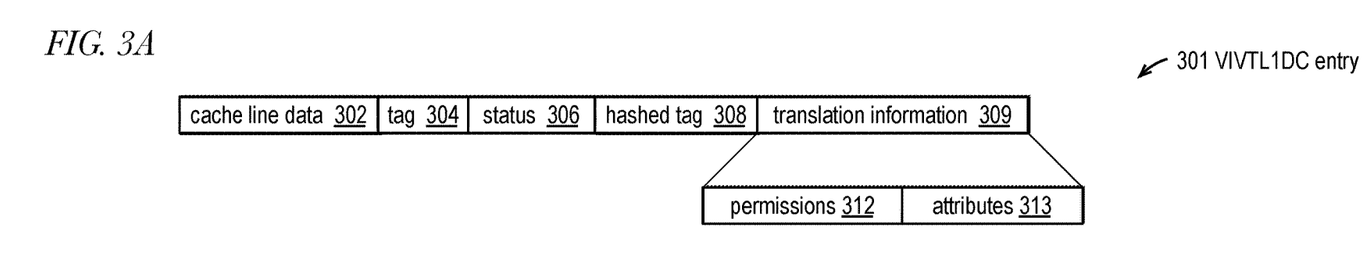
FIG. 3A is an example block diagram of a cache entry of the VIVTL1DC of FIG. 2 in accordance with embodiments of the present disclosure.

FIG. 3A is an example block diagram of a cache entry 301 of VIVTL1DC 103 of FIG. 2 in accordance with embodiments of the present disclosure. The cache entry 301 is used in the embodiment of FIG. 4 described in more detail below. The cache entry 301 includes cache line data 302, a tag 304, a status field 306, a hashed tag field 308, and translation information 309. The translation information 309 includes permissions 312 and attributes 313 sub-fields. The permissions 312 may specify memory access permissions such as whether a memory location has read permissions, write permissions, execute permissions, and permission to be accessed by a process executing at user privilege level. The attributes 313 may specify access attributes of memory locations such as the access types write-back (i.e., cacheable), uncacheable, and write-combine. In one embodiment, the load/store instructions in question are cacheable loads and stores, i.e., they specify load/store addresses in cacheable (e.g., write-back) memory regions. The cache line data 302 is the copy of the line of memory brought into the VIVTL1DC 103 from system memory, in some embodiments indirectly through a higher level of the cache memory hierarchy, e.g., L2 cache 107. In the case of a load instruction, the cache line data 302 is provided on data out bus 427 of FIG. 4, unless the load instruction does not have permission to access the load address.

The tag 304 comprises upper bits (e.g., tag bits 422 of FIG. 4) of the virtual memory address (e.g., virtual address 423 of FIG. 4) specified by the instruction that brought the cache line into the VIVTL1DC 103, e.g., the virtual memory address specified by a load/store instruction. That is, when an entry in the VIVTL1DC 103 is filled, the tag bits 422 of the virtual memory address 423 are written to the tag 304 of the entry. When the VIVTL1DC 103 is subsequently accessed (e.g., by a subsequent load/store instruction), the tag 304 is used to determine whether the access hits in the VIVTL1DC 103. Generally speaking, the VIVTL1DC 103 uses lower bits (e.g., index bits 426 of FIG. 4) of the virtual memory address to index into the VIVTL1DC 103 and uses the remaining bits of the address above the index bits as the tag bits. To illustrate by way of example, assume a 64 kilobyte (KB) VIVTL1DC 103 arranged as a 4-way set associative cache having 64-byte cache lines; address bits [5:0] are an offset into the cache line, virtual address bits [13:6] (index bits) are used as the set index, and virtual address bits [N−1:14] (tag bits) are used as the tag, where N is the number of bits of the virtual memory address, e.g., N=64. In one embodiment, the tag 304 also includes the ASID 195, VMID 197 and TM 199 at the time the entry 301 was filled.

The status 306 indicates the state of the cache line. More specifically, the status 306 indicates whether the cache line data is valid or invalid. Typically, the status 306 also indicates whether the cache line has been modified since it was brought into the cache memory. The status 306 may also indicate whether the cache line is exclusively held by the cache memory or whether the cache line is shared by other cache memories in the system. An example protocol used to maintain cache coherency defines four possible states for a cache line: Modified, Exclusive, Shared, Invalid (MESI).

The hashed tag 308 is a hash of the tag bits 422 of FIG. 4 of the virtual memory address 423, as described in more detail below. In one embodiment, the hashed tag 308 also includes a hash of the ASID 195, VMID 197, TM 199 at the time the entry 301 was filled. Advantageously, the hashed tag 308 may be used to generate a predicted early miss indication, e.g., miss 429 of FIG. 4, and may be used to generate a predicted early way select signal, e.g., way select 442 of FIG. 4, as described in more detail with respect to FIG. 4.

Figure 4:
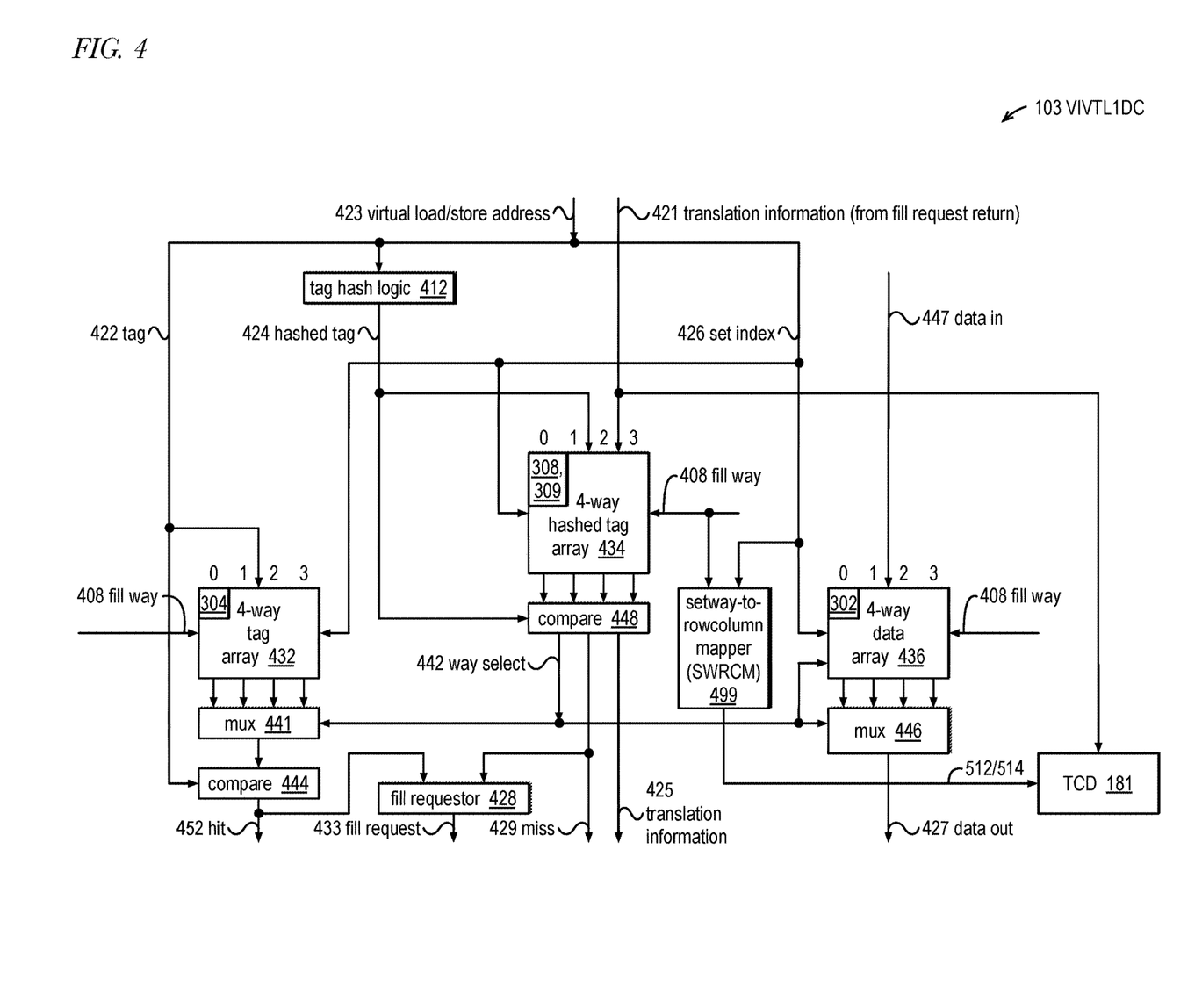
FIG. 4 is an example block diagram illustrating the VIVTL1DC of FIG. 2 in accordance with embodiments of the present disclosure.

The translation information 309 is populated via translation information 421 of FIG. 4 based on the fill request return received from the L2 cache 107, as described above. On a hit of the VIVTL1DC 103, the translation information 309 is provided as translation information 425 of FIG. 4. The permissions 312 are reflective of permissions associated with a physical memory page that includes the cache line data associated with the entry 301. For example, the permissions 312 may be reflective of a valid/present bit from a page table entry (PTE) that indicates whether or not the implicated memory page is currently present in physical memory or has been paged out to a backing store. A page is not present if the valid/present bit in the PTE is clear. For another example, the permissions 312 may include indications of whether the memory page is readable, writable and/or executable. The permissions 312 may also include an indication whether the page is accessible by a user mode process. The permissions 312 may be used to determine whether a load/store instruction generates the need for an architectural exception. In one embodiment directed to the RISC-VISA that supports permissions/attributes mechanisms in addition to PTE page permissions, the permissions may additionally reflect permissions indicated by mechanisms other than the PTE page permissions, e.g., physical memory protection (PMP) registers or physical memory attribute (PMA) registers.

Figure 3B:
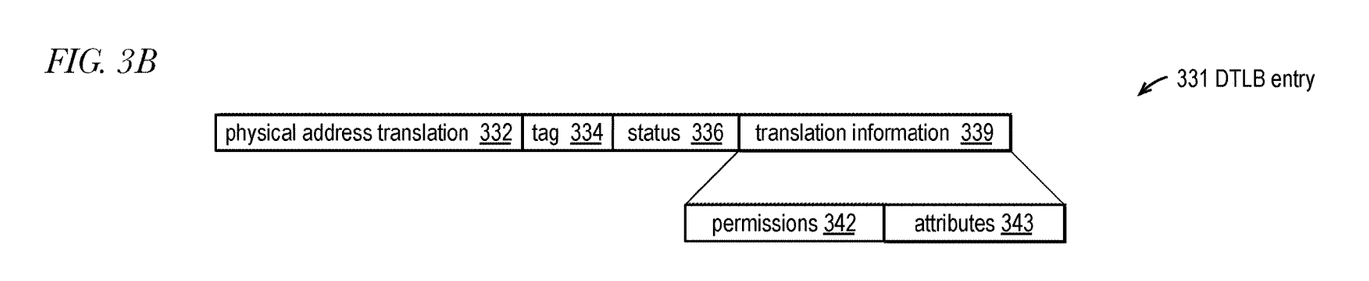
FIG. 3B is an example block diagram of an entry of the DTLB of FIG. 2 in accordance with embodiments of the present disclosure.

FIG. 3B is an example block diagram of an entry 331 of DTLB 141 of FIG. 1 in accordance with embodiments of the present disclosure. The DTLB entry 331 includes a physical address translation 332, a tag 334, a status field 336, and translation information 339. The physical address translation 332 is a translation of a virtual address, e.g., such as virtual load/store addresses 423 of FIG. 4. The tag 334 and status 336 may be similar to the address tag 304 and status 306 of FIG. 3A and serve similar purposes for the DTLB 141 to the purposes the address tag 304 and status 306 of FIG. 3A serve for the VIVTL1DC 103. In one embodiment, the translation information 339 is similar to the translation information 309 of FIG. 3A.

Figure 3C:
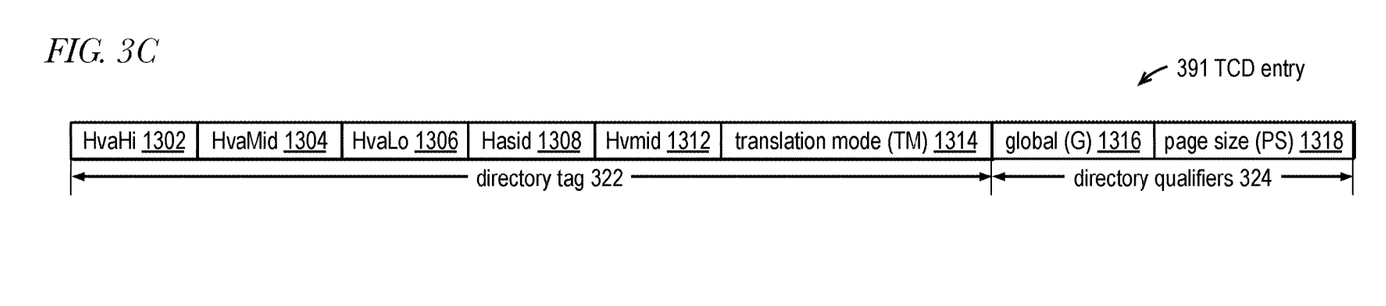
FIG. 3C is an example block diagram of an entry of the TCD of FIG. 1 in accordance with embodiments of the present disclosure.

FIG. 3C is an example block diagram of an entry 391 of the TCD 181 of FIG. 1 in accordance with embodiments of the present disclosure. The TCD entry 391 includes the following fields: HvaHi 1302, HvaMid 1304, HvaLo 1306, Hasid 1308, Hvmid 1312, translation mode (TM) 1314, global (G) 1316, page size (PS) 1318. The HvaHi 1302, HvaMid 1304, HvaLo 1306, Hasid 1308, Hvmid 1312, and translation mode (TM) 1314 are referred to collectively as the directory tag 322. The G 1316 and PS 1318 are referred to collectively as the directory qualifiers 324. A TCD entry 391 is populated during a fill of its corresponding entry 301 in the VIVTL1DC 103 in response to a miss of a virtual address (VA) in the VIVTL1DC 103, as described below with respect to FIG. 6. HvaHi 1302 is a hash of upper bits of the VA that missed in the VIVTL1DC 103 causing a fill into the VIVTL1DC 103 and TCD 181, HvaMid 1304 is a hash of middle bits of the VA, HvaLo 1306 is a hash of lower bits of the VA, Hasid 1308 is a hash of the ASID 195 associated with the fill, Hvmid 1312 is a hash of the VMID 197 associated with the fill, TM 1314 is the TM 199 associated with the fill, G 1316 is the global bit from the page table, and PS 1318 is the page size returned from the DTLB 141 and which is a product of a page table walk performed by the TWE 145. In one embodiment, the upper/middle/lower bits of the VA are selected based on different supported page sizes. For example, in an embodiment in which 4 KB, 2 MB, 1 GB, and 512 GB pages are supported, the lower bits correspond to VA [20:12], the middle bits correspond to VA [29:21], and the upper bits correspond to VA [Q−1:30], where Q is the virtual address size. As described below, the directory tag 322 is used to compare against a target tag included in a TCD snoop 205, and the directory qualifiers 324 are used to control which fields in the directory/target tag comparison are to be ignored.

FIG. 4 is an example block diagram illustrating the VIVTL1DC 103 of FIG. 2 in accordance with embodiments of the present disclosure. The VIVTL1DC 103 is a virtual cache, i.e., it is virtually-indexed and virtually-tagged. The VIVTL1DC 103 includes a tag array 432, a data array 436, a hashed tag array 434, a multiplexer 441, a comparator 444, a multiplexer 446, a comparator 448, tag hash logic 412, a cache line fill requestor 428, and a setway-to-rowcolumn mapper (SWRCM) 499. The TCD 181 is also shown in FIG. 4. The VIVTL1DC 103 also includes a virtual load/store address input 423. The virtual load/store address 423 includes a tag 422 portion and a set index 426 portion. Although not shown, the virtual load/store address 423 may also include the ASID 195, VMID 197, and TM 199, which may be included in the tag 422 and may be hashed by the tag hash logic 412 into the hashed tag 424. The VIVTL1DC 103 also includes a fill way input 408 for filling an entry into the VIVTL1DC 103. The VIVTL1DC 103 also includes a data in input 447 for writing data into the VIVTL1DC 103, e.g., during commit of a store instruction and during a fill of an entry 301. Because the VIVTL1DC 103 is virtually-indexed and virtually-tagged, no physical address bits are needed to access it and, therefore, the VIVTL1DC may be accessed without the need for a physical address translated from the virtual load/store address 423.

The VIVTL1DC 103 also includes a hit output 452, an early miss prediction 429, a translation information 425 output, and a data out output 427. In the embodiment of FIG. 4, the VIVTL1DC 103 is logically arranged as a 4-way set associative cache. In one embodiment in which the VIVTL1DC 103 is a 64 KB cache with 1024 entries 301 each holding a 64-byte cache line, each of the tag array 432, the hashed tag array 434, and the data array 436 is a random access memory (RAM) physically arranged as 256 rows and 4 columns matching the set and way associativity, i.e., the logical arrangement, of the VIVTL1DC 103. In an alternate embodiment, the tag array 432 is a RAM physically arranged as 1024 rows and 1 column. In such an embodiment, when the VIVTL1DC 103 is accessed, the 8-bit set index 426 is concatenated with the 2-bit early way select 442 to form a 10-bit row select into the tag array 432, and when an entry 301 of the VIVTL1DC 103 is filled, the 8-bit set index 426 is concatenated with the 2-bit fill way 408 to form a 10-bit row select. However, other embodiments are contemplated in which the associativity has a different number of ways than four, and the physical arrangement of the tag array 432, the hashed tag array 434, and the data array 436 are different than the examples described.

In one embodiment, the VIVTL1DC 103 comprises an array of E flip-flops that serve as the E valid bits (e.g., a valid bit of the status 306) for the E entries 301 of the VIVTL1DC 103. Each of the E flip-flops receives on its reset input a respective bit of a flash invalidate vector (e.g., 594 of FIG. 5) that enables any or all of the entries 301 to be invalidated in a single clock cycle. As described in more detail below, the flash invalidate vector 594 may be used to invalidate up to C entries 301 per clock to process a TLBMI, where C is the number of columns of the TCD 181, facilitating processing of a TLBMI in R clock cycles, where R is the number of rows of the TCD 181. The set index 426 selects the set of entries on each fill or access, e.g., load/store instruction.

In the embodiment of FIG. 4, each entry of the VIVTL1DC 103 is structured as the entry 301 of FIG. 3A, having cache line data 302, a tag 304, a status 306, a hashed tag 308, and translation information 309. The data array 436 holds the cache line data 302 associated with each of the entries 301 of the VIVTL1DC 103. The tag array 432 holds the tag 304 associated with each of the entries 301 of the VIVTL1DC 103. The hashed tag array 434 holds the hashed tag 308 and translation information 309 associated with each of the entries 301 of the VIVTL1DC 103. In one embodiment, the status 306 of each entry is also stored in the tag array 432, whereas in another embodiment the VIVTL1DC 103 includes a separate memory array for storing the status 306 of the entries. Although in the embodiment of FIG. 4 the data array 436 and tag array 432 are separate, other embodiments are contemplated in which the data and tag (and status) reside in the same memory array.

The cache line fill requestor 428 receives the early miss indication 429 and the hit signal 452 (both of whose generation are described in more detail below) and generates a cache line fill request 433 if the early miss indication 429 indicates a miss (i.e., is true) or if the hit signal 452 indicates a miss (i.e., is false). The fill request 433 is provided to the DTLB 141. The fill request 433 specifies the load/store address 423. When a load/store address 423 accesses the VIVTL1DC 103 and hits on an entry 301, i.e., a valid tag match occurs, the hit signal 452 is true and the miss signal 429 is false. As a result, the fill requestor 428 does not generate a fill request 433.

The tag hash logic 412 hashes the tag 422 portion of the virtual load/store address 423 to generate the hashed tag 424. That is, the tag 422 is an input to a hash function performed by tag hash logic 412 that outputs the hashed tag 424. The hash function performs a logical and/or arithmetic operation on its input bits to generate output bits. For example, in one embodiment, the hash function is a logical exclusive-OR on at least a portion of the tag 422 bits. The number of output bits of the hash function is the size of the hashed tag 424 and the hashed tag field 308 field of the data cache entry 301. The hashed tag 424 is provided as an input to the hashed tag array 434 for writing into the hashed tag 308 of the selected entry 301 of the hashed tag array 434, e.g., during a fill. Similarly, translation information 421 obtained from a fill request return are written into the translation information 309 of the selected entry 301 of the hashed tag array 434 during a fill. The set index 426 selects the set of entries of the hashed tag array 434. In the case of a fill, the hashed tag 424 and translation information 421 are written into the hashed tag 308 and translation information 309, respectively, of the entry of the way selected by the fill way input 408 of the selected set. In the case of an access, comparator 448 compares the hashed tag 424 with each of the hashed tags 308 of the selected set. If there is a valid match, the early miss signal 429 is false and the way select 442 indicates the matching way and the translation information 309 of the matching way is provided as translation information 425; otherwise, the early miss signal 429 is true.

Because the hashed tag 424 and the hashed tags 308 are small (e.g., 16 bits as an illustrative example) relative to the tag 422 and tags 304 (e.g., 54 bits as an illustrative example), the comparison performed by comparator 448 may be faster than the comparison performed by comparator 444 (described more below), for example. Therefore, the way select 442 may be signaled by an earlier stage in the data cache memory 103 pipeline than an embodiment that relies on a comparison of the tags 304 of the tag array 432 to generate a way select. This may be advantageous because it may shorten the time to data out 427 and may provide the translation information 425 sooner.

Additionally, the early miss prediction 429 may be signaled by an earlier stage than the stage that signals the hit indicator 452 (described in more detail below). This may be advantageous because it may enable the cache line fill requestor 428 to generate a cache line fill request 433 to fill a missing cache line earlier than an embodiment in which the cache line fill requestor 428 would rely solely on a comparison of the tags 304 in the tag array 432 to detect a miss via a false value on hit indicator 452. Thus, the hashed tag array 434 may enable a high performance, high frequency design of the processor 100.

Due to the nature of the hashed tag 424, if the early miss indicator 429 indicates a false value, i.e., indicates a hit, the hit indication may be incorrect, i.e., the hit indicator 452 may subsequently indicate a false value, i.e., a miss. Thus, the early miss indicator 429 is a prediction, not necessarily a correct miss indicator. This is because differing tag 422 values may hash to the same value. However, if the early miss indicator 429 indicates a true value, i.e., indicates a miss, the miss indication is correct, i.e., the hit indicator 452 will also indicate a miss, i.e., will indicate a false value. This is because if two hash results are not equal (assuming they were hashed using the same hash algorithm), then they could not have been generated from equal inputs, i.e., matching inputs.

The tag 422 is provided as an input to the tag array 432 for writing into the tag 304 field of the selected entry of the tag array 432, e.g., during a fill. The set index 426 selects the set of entries of the tag array 432. In the case of a fill, the tag 422 is written into the tag 304 of the entry of the way selected by the fill way input 408 of the selected set. In the case of an access (e.g., a load/store instruction), the mux 441 selects the tag 304 of the way selected by the early way select 442, and the comparator 444 compares the tag 422 with the tag 304 of the selected set. If there is a valid match, the hit signal 452 is true; otherwise, the hit signal 452 is false. In the embodiment of FIG. 4, cache line fill requestor 428 advantageously uses the early miss prediction 429 provided by the hashed tag array 434 to generate a fill request 433 as soon as possible, rather than waiting for the hit signal 452. However, in embodiments of the LSU 117 that employ the VIVTL1DC 103 of FIG. 4, the cache line fill requestor 428 is also configured to examine both the early miss prediction 429 and the hit indicator 452, detect an instance in which the early miss prediction 429 predicted a false hit—i.e., the hit indicator 452 indicates a miss even though the early miss prediction 429 indicated a hit—and generate a fill request 433 accordingly.

The data array 436 receives the data in input 447 for writing into the cache line data 302 field of the selected entry of the data array 436, e.g., during a cache line fill or commit of a store instruction. The set index 426 selects the set of entries of the data array 436. In the case of a fill, the way of the selected set is selected by the fill way input 408, and in the case of a memory access operation (e.g., load/store instruction) the way is selected by the way select signal 442. In the case of a read operation (e.g., load instruction), the mux 446 receives the cache line data 302 of all four ways and selects one of the ways based on the way select signal 442, and the cache line data 302 selected by the mux 446 is provided on the data out output 427.

The SWRCM 499 receives the set index 426 and the fill way 408 during a fill of an entry 301 of the VIVTL1DC 103 and maps them into a row select 512 and a column select 514 that are used to fill the corresponding entry 391 of the TCD 181. The TCD 181 and generation of the row select 512 and the column select 514 by the SWRCM 499 are described in more detail below with respect to FIG. 5.

Figure 5:
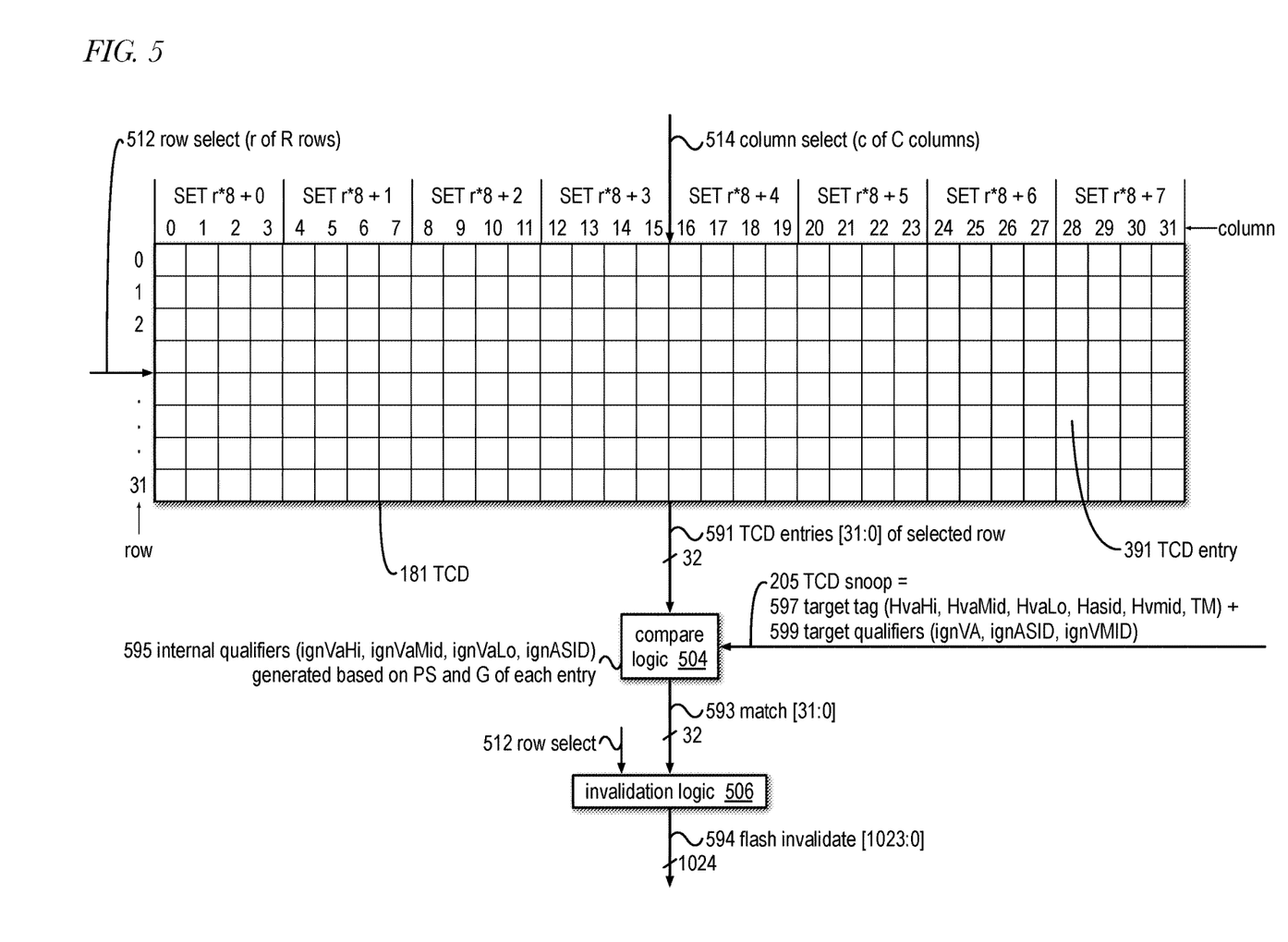
FIG. 5 is an example block diagram illustrating the TCD of FIG. 1 in accordance with embodiments of the present disclosure.

FIG. 5 is a block diagram illustrating an example TCD 181 of FIG. 1 in accordance with embodiments of the present disclosure. The TCD 181 comprises a random access memory (RAM) of TCD entries 391. As described above, the TCD 181 RAM is physically arranged in a wider and shallower manner than the RAMs of the VIVTL1DC 103, i.e., the TCD 181 has significantly fewer rows than the VIVTL1DC 103 and correspondingly has significantly more columns than the VIVTL1DC 103, such that all the entries of the TCD may be searched in significantly fewer clock cycles than all the entries of the VIVTL1DC 103 in order to advantageously determine which entries of the VIVTL1DC 103 need to be invalidated in response to a TLBMI in a higher performance manner.

Generally speaking, the TCD 181 is physically arranged as R rows and C columns of TCD entries 391 of FIG. 3C for a total of R*C=E TCD entries 391, where E is the number of entries 301 of the VIVTL1DC 103. The example embodiment of the TCD 181 shown in FIG. 3C is configured to facilitate rapid TLB consistency for a VIVTL1DC 103 having E=1024 entries 301, e.g., an associativity having a logical arrangement of S=256 sets and W=4 ways corresponding to the example embodiment of the VIVTL1DC 103 of FIG. 4, such that E=256*4=1024 entries 301. However, in other embodiments the TCD 181 may be configured to facilitate rapid TLB consistency for a VIVTL1DC 103 having a different number of entries 301 and/or a different logical arrangement, i.e., a different associativity. In the embodiment of FIG. 5, R=32 and C=32 for a total of E=32*32=1024 TCD entries 391 to match the 1024 entries 301 of the VIVTL1DC 103 of FIG. 4. However, in other embodiments the TCD 181 may be physically configured with a different number of R rows and a different number of C columns, where R*C=E entries 391, to facilitate rapid TLB consistency for a VIVTL1DC 103 having R*C=E entries 301.

The TCD 181 receives a row select 512 to select one of the R rows and a column select 514 to select one of the C columns. As described below with respect to FIG. 6, during a fill of a TCD entry 391, the LSU 117 (e.g., SWRCM 499 of FIG. 4) generates a value on the row select 512 to select one row of the R rows and generates a value on the column select 514 to select one column of the C columns, which selects a TCD entry 391 in the selected row and column for filling.

In one embodiment, during a fill of the VIVTL1DC 103 and the TCD 181, the SWRCM 499 receives the set index 426 of the fill virtual address and receives the allocated fill way 408 and maps them into the row select 512 and column select 514 to select the entry 391 of the TCD 181 that corresponds to the entry 301 of the VIVTL1DC 103 that is being filled. The mapping between VIVTL1DC 103 set index and way to TCD 181 row and column may take the form of various embodiments. FIG. 5 illustrates one possible mapping. Assume VIVTL1DC 103 has S sets and W ways such that S*W=E. In the example embodiment, S=256*W=4=E=1024. In the example embodiment of FIG. 5, each row of the TCD 181 includes C=32 entries 391 in C=32 columns of the row, shown as columns 0-31 in FIG. 5. The 32 columns correspond to ways 0-3 of each of eight adjacent sets of the VIVTL1DC 103. The eight adjacent sets are different for each row. More specifically, the first set of each set of eight is set r, where r is the value of the row select 512. That is, within a given row, columns 0-3 correspond to ways 0-3 of set r*8+0; columns 4-7 correspond to ways 0-3 of set r*8+1; columns 8-11 correspond to ways 0-3 of set r*8+2; columns 12-15 correspond to ways 0-3 of set r*8+3; columns 16-19 correspond to ways 0-3 of set r*8+4; columns 20-23 correspond to ways 0-3 of set r*8+5; columns 24-27 correspond to ways 0-3 of set r*8+6; and columns 28-31 correspond to ways 0-3 of set r*8+7. Thus, to illustrate by example, the entries 391 of row 3 correspond to the entries 301 of ways 0-3 of sets 24 through 31. In such an embodiment, assuming the set index 426 is VA[13:6], the SWRCM 499 forms the row select 512 with VA[13:9] (i.e., the upper 5 bits of the set index 426) and forms the column select 514 by taking VA[8:6] (i.e., the lower 3 bits of the set index 426) as the upper 3 bits of the column select 514 and concatenating them with the 2 bits of the fill way 408 as the lower 2 bits of the column select 514.

As described below with respect to FIG. 7, in response to a TCD snoop 205 operation, as part of execution of a TLBMI, the LSU 117 generates an initial value on the row select 512 to select an initial row of C TCD entries 391 to read out, shown as TCD entries 591 in FIG. 5, and continues generating different values on the row select 512 to cycle through all the R rows of the TCD 181. The column select 514 is ignored when reading the TCD 181, i.e., is only used when filling an entry 391 of the TCD 181.

Compare logic 504 receives the C TCD entries 591 and receives a TCD snoop 205 and in response generates C match indicators 593. The TCD snoop 205 includes two parts: a target tag 597 and target qualifiers 599. The target tag 597 includes six parts that correspond to the six like-named fields of the directory tag 322: HvaHi, HvaMid, HvaLo, Hasid, Hvmid, and TM. Analogous to the directory tag 322 fields, HvaHi is a hash of upper bits of the VA specified by the TLBMI, HvaMid is a hash of middle bits of the VA, HvaLo is a hash of lower bits of the VA, Hasid 1308 is a hash of the ASID specified by the TLBMI, Hvmid 1312 is a hash of the VMID specified by the TLBMI, and TM indicates whether the TLBMI indicates to snoop entries 301 of the VIVTL1DC 103, using the TCD 181, that were translated while running in a virtual machine or not running in a virtual machine. The target qualifiers 599 include signals ignVA, ignASID, and ignVMID whose generation and use are described below.

The comparison performed by the compare logic 591 for each TCD entry 591 to generate the corresponding match indicator 593 comprises six sub-comparisons, one for each of the corresponding like-named fields of the directory tag 322 and target tag 597: an HvaHi sub-comparison, an HvaMid sub-comparison, an HvaLo sub-comparison, an Hasid sub-comparison, an Hvmid sub-comparison, and a TM sub-comparison. One or more of the sub-comparisons may be ignored in the generation of the match indicator 593 depending upon the values of signals ignVaHi, ignVaMid, ignVaLo, and ignASID of internal qualifiers 595 generated by the compare logic 591 which are described below and depending upon the values of the ignVA, ignASID, and ignVMID signals of the target qualifiers 599, whose generation and use will now be described.

In one embodiment, the DTLB 141 generates a true value on the ignVA signal if the TLBMI type indicates the TLB invalidations are not VA-specific, e.g., because the operating system wants to invalidate TLB entries for all page translations associated with a specified ASID. In one embodiment, the DTLB 141 generates a true value on the ignASID signal if the TLBMI type indicates the TLB invalidations are not ASID-specific, e.g., because the operating system wants to include global page translations in the TLB entry invalidations. In one embodiment, the DTLB 141 generates a true value on the ignVMID signal if the TLBMI type indicates the TLB invalidations are not VMID-specific, e.g., because the hypervisor wants to invalidate TLB entries across all virtual machines. The compare logic 591 applies the values of the target qualifiers 599 to the comparisons of all C TCE entries 591.

The compare logic 504 also generates internal qualifiers 595 ignVaHi, ignVaMid, ignVaLo, and ignASID for each of the TCD entries 591 based on the G 1316 and the PS 1318 of the TCD entry 591. That is, unlike the target qualifiers 599 that are applied to the comparisons of all C TCD entries 591, the internal qualifiers are individually generated for and individually applied to the C TCD entries 591. One or more of the sub-comparisons may be ignored in the generation of the match indicator 593 depending upon the values of the internal qualifiers 595. In one embodiment, if the G bit 1316 is true, the compare logic 591 generates a true value on the ignASID signal so that the Hasid comparison is ignored and the compare logic 504 assumes a mismatch of the ASID. In other cases of ignoring sub-comparisons, a match is assumed; whereas, in the case of the internal qualifier 595 ignASID signal, a mismatch is assumed such that if the TLBMI specifies to invalidate a specified ASID that hashes to a match with the Hasid 1308 of an entry 391 whose G bit 1316 is true, then the entry 301 of the VIVTL1 DC 103 that corresponds to the entry 391 will not be invalidated. In an example embodiment described above that supports 4 KB, 2 MB, 1 GB, and 512 GB page sizes: if the PS 1318 indicates a 512 GB page, the compare logic 591 generates a true value on the ignVaHi, ignVaMid, and ignVaLo signals so that the HvaHi, HvaMid, and HvaLo sub-comparisons are ignored; if the PS 1318 indicates a 1 GB page, the compare logic 591 generates a false value on the ignVaHi signal and a true value on the ignVaMid and ignVaLo signals so that the HvaMid and HvaLo sub-comparisons are ignored; if the PS 1318 indicates a 2 MB page, the compare logic 591 generates a false value on the ignVaHi and ignVaMid signals and a true value on the ignVaLo signal so that the HvaLo sub-comparison is ignored; if the PS 1318 indicates a 4 KB page, the compare logic 591 generates a false value on the ignVaHi, ignVaMid, and ignVaLo signals so that none of the HvaHi, HvaMid, and HvaLo sub-comparisons are ignored.

The invalidation logic 506 receives the match indicators 593 and the row select 512 and uses them to generate a flash invalidate vector 594. The flash invalidate vector 594 includes a bit for each entry 301 of the VIVTL1DC 103. That is, the flash invalidate vector 594 is E bits, which is 1024 bits in the example embodiment of FIG. 5. The invalidation logic 506 sets to true each bit of the flash invalidate vector 594 corresponding to an entry 391 of the TCD 181 having a true match indicator 593. As described above, in one embodiment the VIVTL1DC 103 includes a valid bit array of flip-flops that may be flash invalidated by the flash invalidate vector 594. Assume the valid bit array index for a given entry 301 of the VIVTL1DC 103 is mapped as VBAI=s*4+w, where s is the set index 426 value and w is the way number. In the example embodiment described above, the VBAI may also be mapped as VBAI=r*32+c, where r is the row select 512 value and c is the column select 514 value. In such an embodiment, the invalidation logic 506 computes a base value B=r*32 and then applies the match indicators 593 to the flash invalidate vector 594 at the base value B, and all the other bits of the flash invalidate vector 594 are false. To illustrate by example, assume in an access of the TCD 181 that row 9 is accessed to generate the match indicators 593. Then B=9*32=288, and the 32 bits [319:288] of the flash invalidate vector 594 are populated with the 32 match indicators 593, and the other bits of the flash invalidate vector 594 are false. As a result, of the 32 entries 301 in sets 72-79 of the VIVTL1DC 103 having a corresponding true bit in the match indicators 593 are invalidated by the flash invalidate vector 594. Such an operation is performed for each row of the R rows of the TCD 181 in response to the TCD snoop 205 to process a TLBMI, as described below with respect to FIG. 7.

Figure 6:
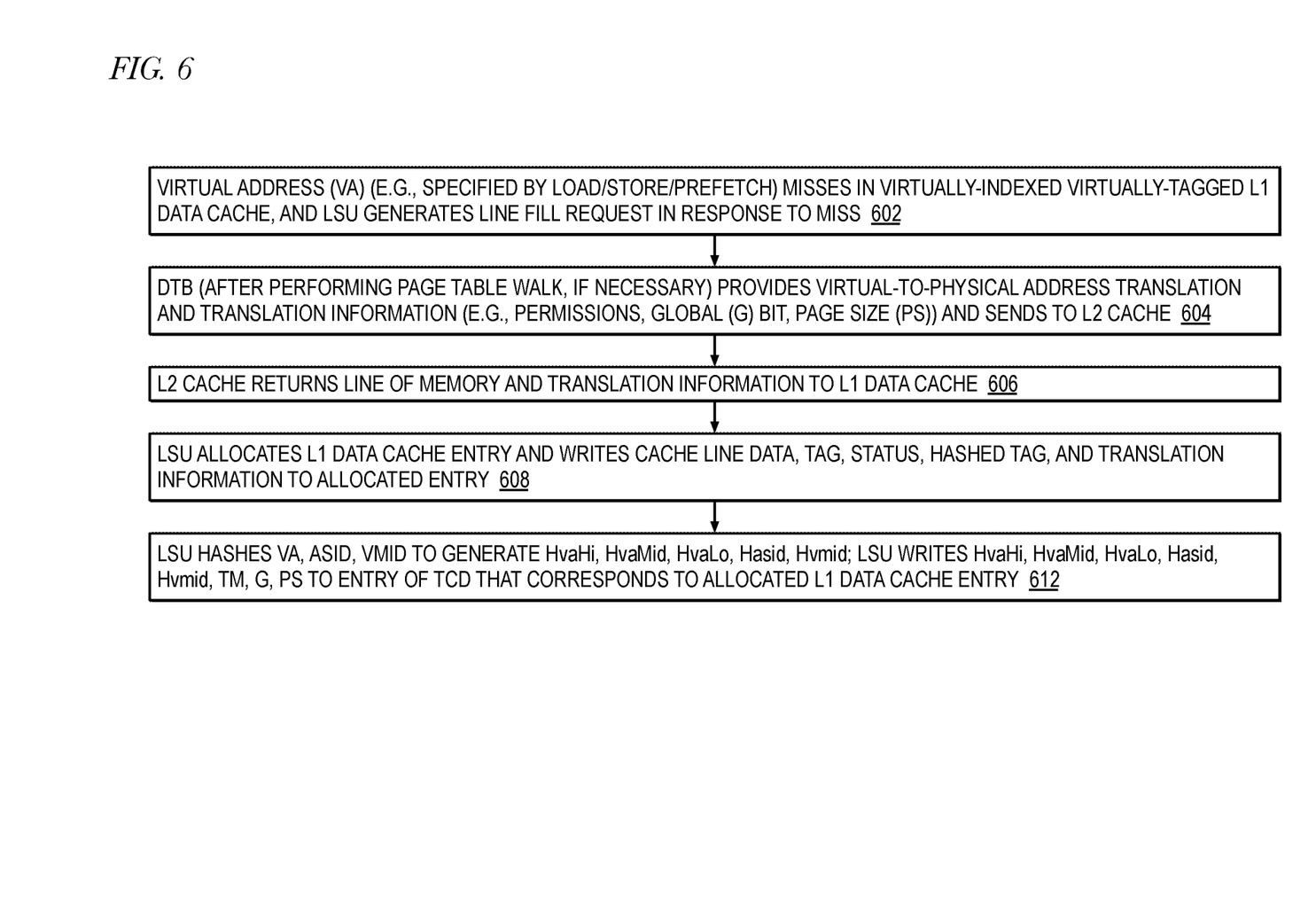
FIG. 6 is an example a flowchart illustrating update of the TCD of FIG. 1 in accordance with embodiments of the present disclosure.

FIG. 6 is an example a flowchart illustrating update of the TCD 181 of FIG. 1 in accordance with embodiments of the present disclosure. Operation begins at block 602.

At block 602, a virtual address (VA) misses in the VIVTL1DC 103. The VA may be specified by a load/store instruction or a hardware prefetch or a software prefetch, for example. In response to the miss, the LSU 117 generates a cache line fill request to the DTLB 141. Operation proceeds to block 604.

At block 604, the DTLB 141 looks up the VA. If the VA misses in the DTLB 141, the DTLB 141 requests the TWE 145 to perform a page table walk to obtain the virtual-to-physical address translation of the VA and associated translation information, which includes the page size associated with the page of memory implicated by the VA, the permissions associated with the page, and the global bit associated with the page. If the VA hits in the DTLB 141, the hit entry of the DTLB 141 will provide the physical address translation, permissions, PS, and G. In either case, the DTLB 141 sends the physical address and translation information to the L2 cache 107. Operation proceeds to block 606.

At block 606, the L2 cache 107 looks up the physical address. If the physical address misses, the L2 cache 107 obtains a copy of the line of memory specified by the physical address from a higher-level cache or from memory. The L2 cache 107 returns to the LSU 117 the copy of the line of memory as well as the translation information, which includes the permissions, the G bit, and the PS. Operation proceeds to block 608.

At block 608, the LSU 117 allocates an entry 301 of the VIVTL1DC 103 and writes to the allocated entry 301 of the VIVTL1DC 103 the tag 422, the hashed tag 424 (which may include the ASID 195, the VMID 197, and the TM 199 in the hash), and the translation information 421, which includes the returned permissions. Operation proceeds to block 612.

At block 612, the LSU 117 hashes the three portions of the VA, the ASID 195, and the VMID 197 to generate the HvaHi, HvaMid, HvaLo, Hasid, and Hvmid, respectively. The LSU 117 then writes the HvaHi, HvaMid, HvaLo, Hasid, Hvmid, TM 199, G, and PS to the TCD entry 391 of the TCD 181 corresponding to the allocated entry 301 in the VIVTL1DC 103. As described above, the LSU 117 (e.g., SWRCM 499) maps the set index and way number of the allocated entry 301 in the VIVTL1DC 103 into the proper values of the row index 512 and column index 514 that select the entry 391 of the TCD 181 that corresponds to the allocated entry 301 in the VIVTL1DC 103.

Figure 7:
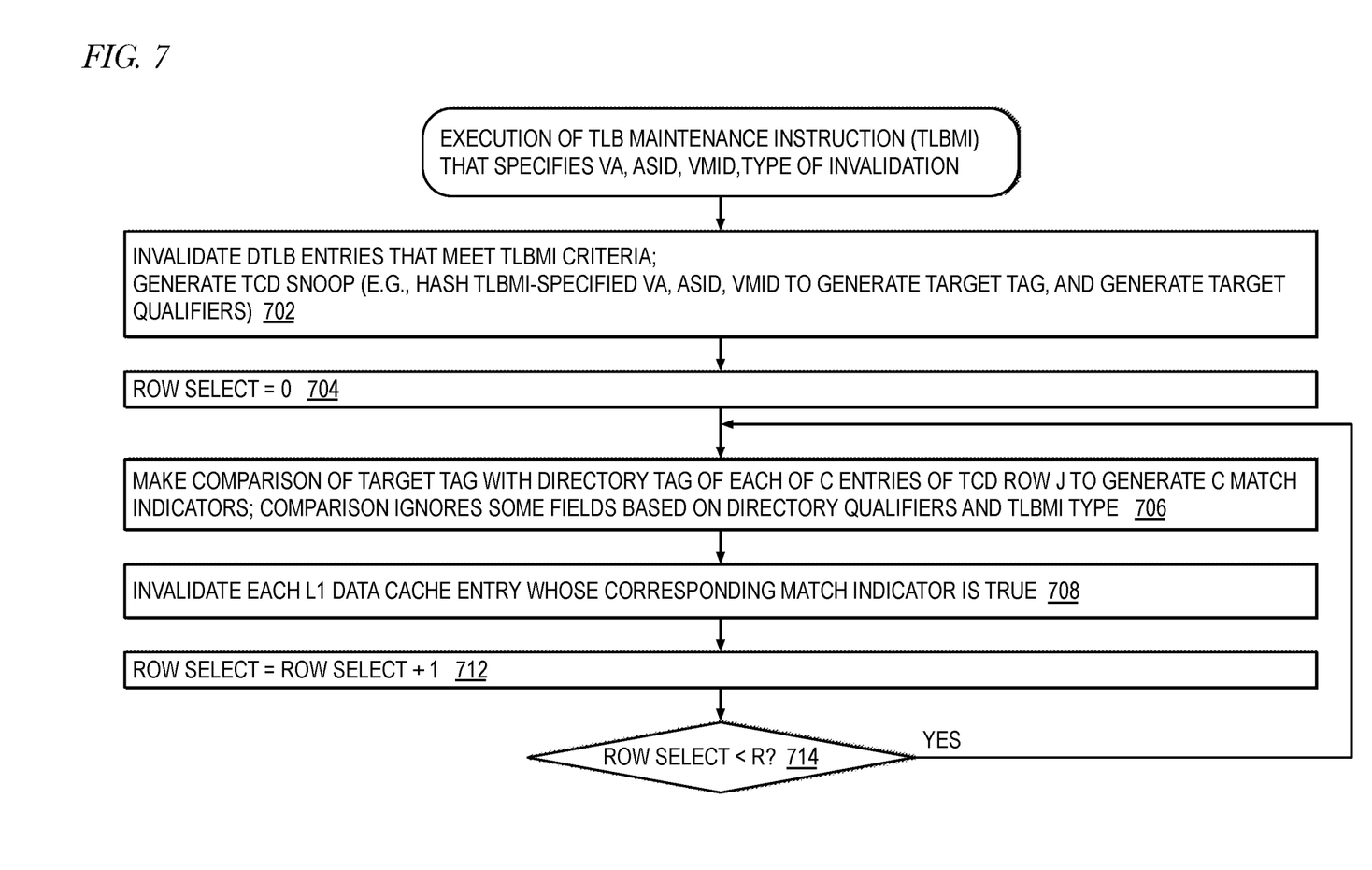
FIG. 7 is an example flowchart illustrating use of the TCD of FIG. 1 during execution of a TLBMI instruction in accordance with embodiments of the present disclosure.

FIG. 7 is an example flowchart illustrating use of the TCD 181 during execution of a TLBMI instruction in accordance with embodiments of the present disclosure. The TLBMI specifies a VA, an ASID, and/or a VMID, along with the type of invalidation operation to be performed. Operation begins at block 702.

At block 702, the DTLB 141 invalidates any entries of the DTLB 141 and ITLB 143 that meet the criteria specified by the TLBMI. Additionally, the DTLB 141 generates the TCD snoop 205 and sends it to the LSU 117. In one embodiment, the DTLB 141 hashes the VA, ASID, and VMID specified by the TLBMI to generate the target HvaHi, HvaMid, HvaLo, Hasid, and Hvmid of the target tag 597. In one embodiment, a first portion of the VA is hashed to generate the target HvaHi, a second portion of the VA is hashed to generate the target HvaMid, and a third portion of the VA is hashed to generate the target HvaLo, as described above. The DTLB 141 also generates the TM and the target qualifiers 599 based on the TLBMI, as described above. Finally, the DTLB 141 sends the TCD snoop 205 to the LSU 117. Operation proceeds to block 704.

At block 704, in response to the TCD snoop 205, the LSU 117 sets the row select 512 to select the first row of the TCD 181, e.g., to a value of zero. Operation proceeds to block 706.

At block 706, the LSU 117 reads the row of the TCD 181 specified by the current row select 512 value, i.e., the TCD 181 outputs all C TCD entries 391 of the row selected by the row select 512. In the example embodiment of FIG. 5, the TCD 181 outputs C=32 entries 591. The compare logic 504 then compares the directory tag 322 of each entry 391 of the TCD entries 591 against the target tag 597, applying the target qualifiers 599 and the internal qualifiers 595 to ignore indicated sub-comparisons, to generate the C match indicators 593, as described above. Operation proceeds to block 708.

At block 708, the LSU 117 (e.g., invalidation logic 506) invalidates each entry 301 of the VIVTL1DC 103 whose corresponding match indicator 593 is true, as described above. In one embodiment, the invalidation logic 506 of the LSU 117 generates the E-bit flash invalidate vector 594 based on the C match indicators 593 and the row select 512, as described above. In an embodiment in which the VIVTL1DC 103 is a write-back cache, any modified entries 301 are written back before the invalidation is performed. Operation proceeds to block 712.

At block 712, the LSU 117 updates (e.g., increments) the row select 512 to a new value to select a row not yet compared. Operation proceeds to decision block 714.

At decision block 714, if there are more rows of the TCD 181 to compare (e.g., the row select 512 value is less than the number of rows R of the TCD 181), operation returns to block 706; otherwise, operation ends.

As described above, the TCD 181 may advantageously significantly reduce the number of clock cycles required to process a TLBMI. Generally speaking, the smaller number of rows R of the TCD 181 the fewer the number of clocks the LSU 117 takes process the TCD snoop 205, i.e., to read and compare all R rows of the TCD 181. However, the fewer number of rows R of the TCD 181 implies an increase in the number of columns, which may have a performance impact by widening the TCD 181 RAM. Advantageously, the width of the TCD 181 RAM is reduced by hashing the larger values of each entry 391, e.g., the VA, ASID, and VMID. Aliasing may result from the hashing, which may result in invalidation of some entries 301 of the VIVTL1DC 103 that need not have been invalidated to process the TLBMI. However, the over-invalidation may be endured in return for the benefit of improved performance of the TLBMI afforded by the TCD 181 and the hashing.

In an embodiment in which the highest VA bit implicated by the largest supported page size (e.g., VA[11] in an embodiment in which 4 KB is the largest supported page size) is lower than the highest VA bit of the VIVTL1DC 103 set index (e.g., VA[13] in the case that the VIVTL1DC 103 has 64-byte cache lines and has 256 sets), an optimization can be made such that only 1/(2^N) sets of the VIVTL1DC 103, and therefore only 1/(2^N) rows of the TCD 181, need be checked in the case of an address-specific TLBMI, wherein N is difference in the number of bits between the highest VA bit of VIVTL1DC 103 set index and the highest VA bit implicated by the largest supported page size.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor, comprising:
  a virtually-indexed and virtually-tagged cache having E entries, where E is the number of entries in the cache, wherein each cache entry is configured to hold:
    a copy of a line of memory at a physical memory line address;
    a tag of a virtual memory line address, wherein the virtual memory line address is translatable into the physical memory line address; and
    permissions associated with a page of memory that encompasses the physical memory line address;
  a directory having an E number of entries corresponding to the E number of cache entries, wherein the directory is physically arranged as R rows and C columns, where R is the number of rows in the directory and C is the number of columns in the directory, wherein R*C=E, wherein each directory entry is configured to hold:
    a directory tag comprising one or more hashes of corresponding one or more portions of a page address, wherein the page address is a portion of the virtual memory line address whose tag is held in the cache entry corresponding to the directory entry; and wherein in response to a translation lookaside buffer management instruction (TLBMI) that specifies a virtual address, the microprocessor is configured to:
generate a target tag comprising one or more hashes of corresponding one or more portions of a page address, wherein the page address is a portion of the virtual address specified by the TLBMI; and
for each row of the R rows of the directory:
for each directory entry of the C directory entries of the row:
make a comparison of the target tag with the directory tag of the directory entry; and
generate a match indictor based on the comparison; and
for each directory entry having a true match indictor, invalidate the corresponding cache entry.

2. The microprocessor of claim 1,
wherein the cache is logically arranged as S sets and W ways and has E=S*W entries, where S is the number of sets in the cache and W is the number of ways in the cache; and
wherein R is less than S, and C is greater than W.

3. The microprocessor of claim 1,
wherein each cache entry has a unique set and way that is specified by a set index and a way number; and
wherein each directory entry has a unique row and column that is specified by mutually exclusive first and second portions of a combination of the set index and way number of the corresponding cache entry.

4. The microprocessor of claim 1,
wherein the comparisons of the target tag with the directory tag of the directory entry are performed concurrently for all C directory entries of the row.

5. The microprocessor of claim 1,
wherein the directory tag and the target tag further comprise a hash of an address space identifier.

6. The microprocessor of claim 5,
wherein each directory entry is further configured to hold a global page indicator; and
wherein to generate the match indicator, if the global page indictor indicates the page of memory is a global page, the microprocessor ignores the comparison of the hash of the address space identifier.

7. The microprocessor of claim 5,
wherein to generate the match indicator, if the TLBMI specifies an address space identifier to be invalidated rather than a virtual address, the microprocessor ignores the comparison of the one or more hashes of the one or more portions of the page address.

8. The microprocessor of claim 1,
wherein the directory tag and the target tag further comprise a hash of a virtual machine identifier.

9. The microprocessor of claim 8,
wherein to generate the match indicator, if the microprocessor is not in a virtual machine mode, the microprocessor ignores the comparison of the hash of the virtual machine identifier.

10. The microprocessor of claim 1,
wherein the directory tag and the target tag further comprise a translation mode.

11. The microprocessor of claim 1,
wherein each directory entry is further configured to hold a page size; and
wherein to generate the match indicator, for different values of the page size, the microprocessor ignores the comparison of corresponding different zero or more of the one or more hashes of the one or more portions of the page address.

12. The microprocessor of claim 1,
wherein the permissions indicate whether the page of memory is readable and/or writeable.

13. The microprocessor of claim 1,
wherein the copy of the line of memory, the tag, and the permissions are written to the cache and the directory tag is written into the directory in response to a miss in the cache of the virtual memory line address.

14. The microprocessor of claim 1, further comprising:
a load/store unit that executes load/store instructions that specify a load/store virtual address; and
wherein the load/store unit is configured to complete execution of the load/store instruction only when the load/store virtual address hits in an entry of the cache and receives the permissions held in the hit upon entry of the cache.

15. A method, comprising:
in a microprocessor comprising:
a virtually-indexed and virtually-tagged cache having E entries, where E is the number of entries in the cache, wherein each cache entry is configured to hold:
a copy of a line of memory at a physical memory line address;
a tag of a virtual memory line address, wherein the virtual memory line address is translatable into the physical memory line address; and
permissions associated with a page of memory that encompasses the physical memory line address; and
a directory having an E number of entries corresponding to the E number of cache entries, wherein the directory is physically arranged as R rows and C columns, where R is the number of rows in the directory and C is the number of columns in the directory, wherein R*C=E, wherein each directory entry is configured to hold:
a directory tag comprising one or more hashes of corresponding one or more portions of a page address, wherein the page address is a portion of the virtual memory line address whose tag is held in the cache entry corresponding to the directory entry;
in response to a translation lookaside buffer management instruction (TLBMI) that specifies a virtual address:
generating a target tag comprising one or more hashes of corresponding one or more portions of a page address, wherein the page address is a portion of the virtual address specified by the TLBMI; and
for each row of the R rows of the directory:
for each directory entry of the C directory entries of the row:
making a comparison of the target tag with the directory tag of the directory entry; and
generating a match indictor based on the comparison; and
for each directory entry having a true match indictor:
invalidating the corresponding cache entry.

16. The method of claim 15,
wherein the cache is logically arranged as S sets and W ways and has E=S*W entries, where S is the number of sets in the cache and W is the number of ways in the cache; and
wherein R is less than S, and C is greater than W.

17. The method of claim 15,
wherein each cache entry has a unique set and way that is specified by a set index and a way number; and
wherein each directory entry has a unique row and column that is specified by mutually exclusive first and second portions of a combination of the set index and way number of the corresponding cache entry.

18. The method of claim 15,
wherein the comparisons of the target tag with the directory tag of the directory entry are performed concurrently for all C directory entries of the row.

19. The method of claim 15,
wherein the directory tag and the target tag further comprise a hash of an address space identifier.

20. The method of claim 19,
wherein each directory entry is further configured to hold a global page indicator; and
wherein said generating the match indicator comprises:
if the global page indictor indicates the page of memory is a global page, ignoring the comparison of the hash of the address space identifier.

21. The method of claim 19,
wherein said generating the match indicator comprises:
if the TLBMI specifies an address space identifier to be invalidated rather than a virtual address, ignoring the comparison of the one or more hashes of the one or more portions of the page address.

22. The method of claim 15,
wherein the directory tag and the target tag further comprise a hash of a virtual machine identifier.

23. The method of claim 22,
wherein said generating the match indicator comprises:
if the microprocessor is not in a virtual machine mode, ignoring the comparison of the hash of the virtual machine identifier.

24. The method of claim 15,
wherein the directory tag and the target tag further comprise a translation mode.

25. The method of claim 15,
wherein each directory entry is further configured to hold a page size; and
wherein said generating the match indicator comprises:
for different values of the page size, ignoring the comparison of corresponding different zero or more of the one or more hashes of the one or more portions of the page address.

26. The method of claim 15,
wherein the permissions indicate whether the page of memory is readable and/or writeable.

27. The method of claim 15, further comprising:
writing the copy of the line of memory, the tag, and the permissions to the cache and writing the directory tag into the directory in response to a miss in the cache of the virtual memory line address.

28. The method of claim 15,
wherein the microprocessor further includes a load/store unit that executes load/store instructions that specify a load/store virtual address; and
wherein the load/store unit is configured to complete execution of the load/store instruction only when the load/store virtual address hits in an entry of the cache and receives the permissions held in the hit upon entry of the cache.

29. A non-transitory computer-readable medium having instructions stored thereon that are capable of causing or configuring a microprocessor comprising:
a virtually-indexed and virtually-tagged cache having E entries, where E is the number of entries in the cache, wherein each cache entry is configured to hold:
a copy of a line of memory at a physical memory line address;
a tag of a virtual memory line address, wherein the virtual memory line address is translatable into the physical memory line address; and
permissions associated with a page of memory that encompasses the physical memory line address;
a directory having an E number of entries corresponding to the E number of cache entries, wherein the directory is physically arranged as R rows and C columns, where R is the number of rows in the directory and C is the number of columns in the directory, wherein R*C=E, wherein each directory entry is configured to hold:
a directory tag comprising one or more hashes of corresponding one or more portions of a page address, wherein the page address is a portion of the virtual memory line address whose tag is held in the cache entry corresponding to the directory entry; and
wherein in response to a translation lookaside buffer management instruction (TLBMI) that specifies a virtual address, the microprocessor is configured to:
generate a target tag comprising one or more hashes of corresponding one or more portions of a page address, wherein the page address is a portion of the virtual address specified by the TLBMI; and
for each row of the R rows of the directory:
for each directory entry of the C directory entries of the row:
make a comparison of the target tag with the directory tag of the directory entry; and
generate a match indictor based on the comparison; and
for each directory entry having a true match indictor, invalidate the corresponding cache entry.

* * * * *

UNITED STATES PATENT AND TRADEMARK OFFICE
CERTIFICATE OF CORRECTION

PATENT NO. : 11,687,466 B1
APPLICATION NO. : 17/751972
DATED : June 27, 2023
INVENTOR(S) : Favor et al.

Page 1 of 1

It is certified that error appears in the above-identified patent and that said Letters Patent is hereby corrected as shown below:

On the Title Page

In Item (57), under "Abstract", in Column 2, Line 16, delete "indictor" and insert -- indicator --, therefor.

In the Claims

In Column 21, Line 14, in Claim 1, delete "indictor" and insert -- indicator --, therefor at each occurrence throughout the claims.

Signed and Sealed this
Twenty-ninth Day of August, 2023

Katherine Kelly Vidal
*Director of the United States Patent and Trademark Office*